United States Patent [19]

Gin et al.

[11] Patent Number: 4,589,894
[45] Date of Patent: May 20, 1986

[54] DISPOSABLE FILTER FOR A VACUUM CLEANER

[75] Inventors: Vincent M. Gin, Hudson; Gene E. Tharp, New Richmond, both of Wis.

[73] Assignee: Minnesota Mining and Manufacturing Co., Saint Paul, Minn.

[21] Appl. No.: 599,265

[22] Filed: Apr. 11, 1984

[51] Int. Cl.⁴ .............................................. B01D 29/12
[52] U.S. Cl. ........................................ 55/274; 55/376; 55/487; 55/382; 55/528
[58] Field of Search ................. 55/274, 368, 374–377, 55/381, 382, 486, 487, 528

[56] References Cited

U.S. PATENT DOCUMENTS

| | | | |
|---|---|---|---|
| 1,835,770 | 12/1931 | Gasner et al. | 55/364 |
| 3,606,740 | 9/1971 | Ballennie | 55/500 |
| 3,871,850 | 3/1975 | Lenane | 55/528 |
| 3,990,872 | 11/1976 | Cullen | 55/274 |
| 4,011,067 | 3/1977 | Carey, Jr. | 55/528 |
| 4,116,648 | 9/1978 | Busch | 55/276 |
| 4,257,791 | 3/1981 | Wald | 55/382 |

FOREIGN PATENT DOCUMENTS

| | | | |
|---|---|---|---|
| 2908102 | 9/1980 | Fed. Rep. of Germany | 55/381 |
| 56455 | 5/1975 | Japan | 55/528 |
| 2036591 | 7/1980 | United Kingdom | 55/382 |

OTHER PUBLICATIONS

INDA Association of the Nonwoven Fabrics Industry, 9th Technical Symposium (Mar. 9–11, 1981).

*Primary Examiner*—Bernard Nozick
*Attorney, Agent, or Firm*—Donald M. Sell; James A. Smith; Richard Francis

[57] ABSTRACT

A vacuum cleaner disposable filter, preferably in the form of a closed container having an inlet for connection to the air discharge outlet of a vacuum cleaner, comprises an assembly of layers including an inner filter layer provided by a non-woven micro-fiber web formed of randomly entangled synthetic polymeric micro-fibers and highly porous outer support layers each preferably comprising spun-bonded non-woven webs on either side of the inner layer.

8 Claims, 5 Drawing Figures

DISPOSABLE FILTER FOR A VACUUM CLEANER

DESCRIPTION

1. Technical Field

The present invention relates to a vacuum cleaner filter, more particularly to an improved vacuum cleaner filter having a micro-fiber filter layer between highly porous support layers.

2. Background Art

Vacuum cleaners have become almost an essential cleaning tool both for domestic and commercial cleaning, particularly if the surfaces being cleaned are formed of fabric such as carpeting or upholstery material. Vacuum cleaners typically have an electric motor which draws air at relatively high velocity and volume adjacent the surface being cleaned, to pick up loose dirt and debris. Most vacuum cleaners then expel an air stream which includes airborne dirt and debris from a discharge outlet which is typically fitted with an air filter which separates the dirt and debris from the air stream. Vacuum cleaners of this general type come in a variety of known arrangements or styles such as upright, canister, shop, etc. The filters for such vacuum cleaners are typically in the form of a bag having a porous wall and an opening into the bag for connection to the discharge outlet.

Some vacuum cleaners do not have a discharge outlet for discharging airborne dust and debris but instead draw the airborne dust and debris through a sheet-like filter which may be in the form of a disc, square or rectangle.

The filters for such vacuum cleaners are, for the most part, typically being formed of paper which is pervious to the flow of air. Such filters are relatively inexpensive but they do not remove extremely fine dirt and dust and have a relatively short useful life.

Paper filters permit passage of fine dust through the bag wall because the paper is constructed to be sufficiently open so as to permit the filter to be at least partially filled with particulate dirt before the air pressure drop across the bag wall increases to a totally unsatisfactory level. Paper filters are relatively easily damaged, causing the filter to perforate. Also, dirt quickly accumulates on the paper surface which causes an increased air pressure drop, reducing the ability of a vacuum cleaner which is fitted with a paper filter to clean effectively.

Reusable filters are known but these are relatively expensive and some are not much better at removing fine dust and dirt particles than the disposable paper filters. U.S. Pat. No. 4,257,791 discloses a typical example of a reuseable filter which is formed of woven cloth or non-woven materials integrated by needle tacking and binding agents.

The selection of materials which form the filter is somewhat limited inasmuch as the filter must be sufficiently strong to withstand the pressure build up in the vacuum cleaner yet have a porosity which permits the passage of air at a sufficient rate without the passage of airborne dirt and dust particles. Thus, while many fabric or web candidates for the filter may appear to be suitable because they are adequate dust collectors, many prove to be unsuitable because of insufficient strength. For example, a publication by INDA Association of the Non-woven Fabrics Industry, 9th Technical Symposium held Mar. 9–11, 1981 reveals, at page 124, referring to FIG. 47, that melt-blown polypropylene micro-fiber webs would provide a superior filter as compared to paper with respect to dust pick up and yet have a low air pressure drop. Such micro-fiber webs, however, are known to be relatively fragile and will not without rupture sustain the pressure build up caused by a vacuum cleaner. Such fragile webs also have insufficient strength to resist damage induced by mechanical erosion caused by the influx of airborne dirt and debris. They also do not have sufficient tensile strength to resist tearing because of sagging as the bottom of the bag fills with dirt. In fact, microfiber webs are known to be very susceptible to damage just in handling and therefore are thought to be unlikely candidates for use in vacuum cleaners where handling to permit filter placement and removal is a must.

U.S. Pat. No. 4,116,648 discloses a disposable vacuum cleaner made by using a relatively weak but efficient fiberglass filter which is spaced between support layers formed of air pervious paper. Such construction, while reinforcing the filter layer, would not be suited for use with the micro-fiber web inasmuch as the paper support members would act much as a paper filter in a conventional disposable vacuum cleaner bag. Such paper filters will typically clog early, drastically reducing the useful life of the filter, plugging the pores so that the passage of air is impaired.

DISCLOSURE OF THE INVENTION

The present invention provides a filter for a vacuum cleaner which effectively removes small particles suspended in air and retains a low pressure drop as the bag becomes filled with particulate material such as dust and dirt. The filter unit of the invention is relatively inexpensive and thus may be disposed of after filling.

The vacuum cleaner filter of the invention may have the form of any conventional filter of the type presently used in conventional vacuum cleaners. Examples of such forms include sheets which may be disc-shaped, rectangular, square, bag-shaped, cylindrical, etc. The preferred filter of the invention comprises a closed container having an inlet for connection to the air discharge outlet of a vacuum cleaner.

The filter of the invention comprises an assembly of juxtaposed layers, as follows: (a) a first outer support layer of highly porous fabric formed of synthetic fibers, the fabric having an air permeability of at least 100 m$^3$/min/m$^2$ and a grab strength of at least about 1.0 kg; (b) an inner filter layer formed of a web comprising randomly interentangled synthetic polymeric microfibers that are less than 10 microns in diameter and having a weight of about 40 to 200 g/m$^2$ and an air permeability of about 3 to 60 m$^3$/min/m$^2$; and (c) a second outer support layer of highly porous fabric formed of synthetic fibers, the second outer support layer being disposed on the opposite side of said web from the first outer support layer, the fabric of the second layer having an air permeability of at least 50 m$^3$/min/m$^2$ and a grab strength of at least about 1.0 kg.

These support layers preferably are highly porous and light weight webs of synthetic fibers which are spun bonded, spun laced, bonded wet laid, or net-like fabrics.

At much lower web weights than 40 g/m$^2$, the web filtering properties are less than adequate. At much higher web weights than 200 g/m$^2$, the pressure drop in use is unacceptable. The grab strength is measured according to ASTM D 1682 using a 50.8 mm sample. If the grab strength is much less than about 1.0 kg, the support layer acts much like paper and will tear or rupture easily. The air permeability of the dirt-receiving side of the filter, the side having the first support layer, should be at least 100 m$^3$/min/m$^2$ to prevent premature undesirable pressure drop in use as the filter fills with dust. The air permeability of the opposite support layer, the second support layer, may be as low as 50 m$^3$min/m$^2$ to provide an adequate air flow and acceptable pressure drop in use. Air permeability is measured by ASTM D 737.

BRIEF DESCRIPTION OF DRAWING

The invention will be more clearly understood with reference to the accompanying drawings, in which.

DESCRIPTION OF THE PREFERRED EMBODIMENT

Figure 1:
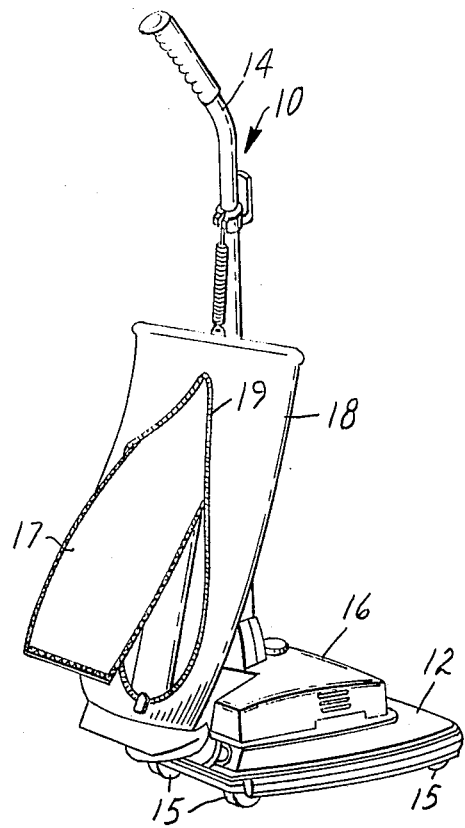
FIG. 1 is a perspective view of a vacuum cleaning apparatus fitted with the improved filter of the invention, and showing the filter partially removed from the access opening in the outer air-pervious dust bag.

Referring to FIG. 1, a conventional upright vacuum cleaner is shown which is referred to generally by the reference numeral 10. The vacuum cleaner includes a base 12 and a vertically disposed handle 14 and is supported for movement on a plurality of wheels 15 which facilitate movement of the vacuum cleaner over the surface to be cleaned. Typically, a motor driven blower or fan (not shown) is mounted in a housing 16 on base 12. The fan operates within housing 16, providing air movement for picking up dust and dirt from the surface being cleaned and causing the moving air to pass into filter bag 17.

Filter bag 17 is shown in FIG. 1 as being partially removed from vacuum cleaner 10. The filter unit is positioned within an outer dust bag 18 which is typically fabricated from a perforated material such as vinyl or cloth. A closable rear opening 19 in outer dust bag 18 provides a means by which filter bag 17 may be inserted or removed from the vacuum cleaner.

Figure 2:
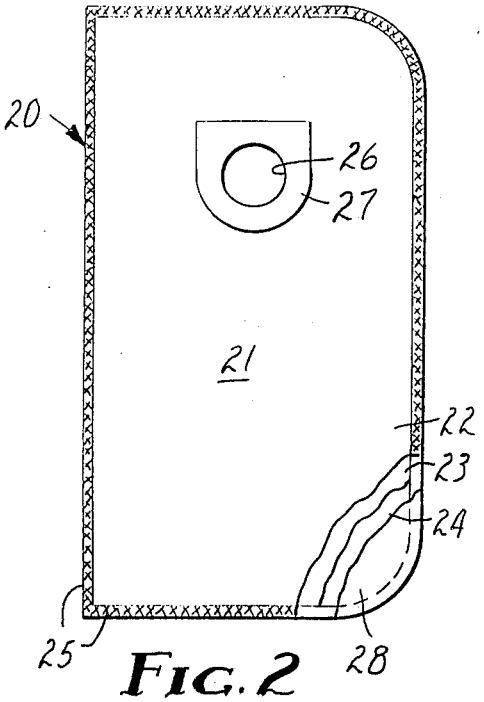
FIGS. 2–4 are perspective views of various embodiments of the filter of the present invention (with parts removed to show additional detail in FIGS. 2 and 3)
Figure 4:
Figure 3:
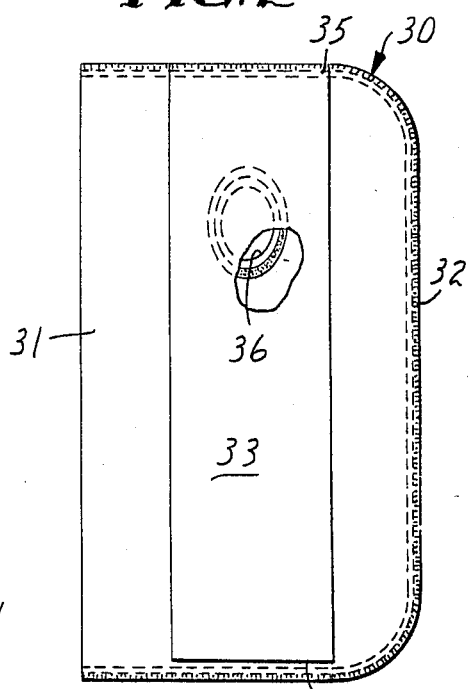

The filter may take any of a variety of shapes, all of which are conventional, such as depicted in FIGS. 2, 3 and 4, for example. The filters commonly comprise a container having an inlet for connection with the air discharge outlet of the vacuum cleaner.

FIG. 2 shows filter bag 20 formed by seaming a suitable layered pervious fabric 21 (formed of outer support layer 22, micro-fiber filter layer 23 and inner support layer 24) to provide seam 25 by conventional means such as sewing, heat sealing, etc. and is closed except for inlet 26 which may be fitted with a suitable appliance 27 for attachment to the outlet (not shown) of a vacuum cleaner. In a preferred embodiment, pervious fabric 21 is seamed to a transparent film 28 to provide a convenient means of viewing inside.

FIG. 3 shows filter bag 30 formed by seaming a suitable layered pervious fabric 31 to provide seam 32, as in FIG. 2, but the inlet is fitted with a pervious or impervious tube 33 having an opening 34 for attachment to the outlet of a vacuum cleaner of the type which utilizes this configuration filter bag. Tube 33 has an opposite closed end 35 which is seamed along with seam 32 and an opening 36 with edges juxtaposed and adhesively bonded to edges of an opening in the fabric wall to provide a substantially leak-free seal. Like filter bag 20 shown in FIG. 2, filter bag 30 may have wall portions which include impervious portions, for example, a transparent film which permits viewing into the filter unit to determine its loading.

FIG. 4 shows yet another embodiment of a disposable filter 40 according to the present invention in the form of a disc.

Figure 5:
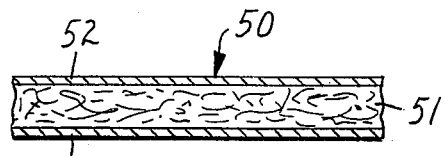
FIG. 5 is a cross-sectional view of the pervious wall of the filter constructed in accordance with the teaching of the present invention.

FIG. 5 shows an enlarged cross sectional view of the layered fabric which forms the pervious portion of the wall of the container of the filter unit of the invention. The layered fabric 50 includes inner micro-fiber layer 51 and first and second outer support layers 52 and 53.

Support layers 52 and 53 are most preferably spun-bonded or spun-laced non-woven webs of synthetic fibers. These non-woven webs preferably weigh between 10 and 70 g/m$^2$, most preferably weigh about 15–25 g/m$^2$, are preferably 0.05–0.35 mm thick, most preferably about 0.05–0.3 mm thick and preferably have an air permeability of 100–400 m$^3$/min/m$^2$, most preferably at least 300 m$^3$/min/m$^2$. These spun-bonded or spun-laced non-woven webs and the micro-fiber web are preferably merely laid together without bonding, relying upon the seaming to keep them together, because bonding tends to reduce air permeability. Spot bonding is acceptable, however, if the size and density of the bond areas is kept at a minimum.

The inner micro-fiber layer of the pervious portion of the container wall is made of micro-fibrous material. Webs of such micro-fibers are well know. They may be prepared with micro-fibers which have been melt-blown (prepared by extruding molten fiber-forming material), solution-blown (prepared by extruding a solvent solution of fiber-forming material), or other means. The micro-fibers can be formed of any of a variety of fiber-forming thermoplastic materials including, for example, polypropylene, polyethylene terephthalate, polyethylene, polyamides, and other polymers known in the art. The preferred thermoplastic material for forming the micro-fibers is polypropylene. Polypropylene is preferred because it has lower melt temperatures and is less expensive than nylon or polyethylene terephthalate.

Useful methods of preparing micro-fibers are described in Wente, Van A. "Superfine Thermoplastic Fibers", *Industrial Engineering Chemistry*, Vol. 48, page 1342 et seq (1956), and Report No. 4364 of the Navel Research Laboratories, published May 25, 1954, entitled "Manufacture of Superfine Organic Fibers" by Wente, V. A., Boone, C. D., and Fluharty, E. L.

Preferred composite webs for vacuum filter bags are made by layering spun-bonded fabric on both sides of a blown micro-fiber web without bonding or spot welding.

As previously mentioned, it has been found that a portion of the vacuum filter bag wall may be formed from transparent film which permits viewing the inside of the bag to determine if the bag is filled. The superior filtering ability of blown micro-fiber composite webs permits bag constructions with impervious portions. Typically up to about 50% of the bag wall area may be the film material. The film is a tough plastic material such as polyester or nylon and of sufficient thickness to have the required resistance to damage and perforation.

Preferably, the film is coated on at least one of its major surfaces with a meltable adherent composition to facilitate heat sealing.

Filter units for some vacuum cleaners require an elongated tube for attachment to the vacuum outlet. As shown in FIG. 3, the elongated tube attaches to vacuum bag wall near the upper end of the bag to facilitate filling the bag with soil and particulate material. If the bag wall is made entirely of blown micro-fiber fabric the elongate tube is preferably made of material that is less air permeable than the micro-fiber fabric because dirt and particulate soil tend to accumulate in the elongate tube because of the porosity. Suitable materials for the tube include plastic film, paper or synthetic papers like "Tyvek" Brand Spun-bonded polyolefin fabric available from E. I. du Pont de Nemours and Companies. If the elongate tube has reduced air permeability, entering airborne soil and particulate material maintain sufficient velocity to be deposited into the bag itself.

EXAMPLES

The invention is illustrated by the following Examples wherein all parts are by weight unless stated otherwise.

EXAMPLE 1

A polypropylene micro-fiber web of melt-blown fibers having an average fiber diameter generally in the range of about 2–6 microns was made in accordance with the teaching in the Naval Research Laboratory article cited above. The web weighed 100 g/m$^2$, was 6 mm thick, had a grab strength of 1.4 kg (ASTM D 1682) both in the machine and cross direction and an air permeability of 12 m$^3$/min/m$^2$ (ASTM D 737). The microfiber web was placed between layers of a spun-bonded polypropylene scrim obtained from Crown Zellerbach under the trade designation "Celestra". The fabric had a weight of 14 g/m$^2$, thickness of 0.13 mm, a grab strength of 3.2 and 1.8 kg respectively in the machine and cross direction and an air permeability of 400 m$^3$/min/m$^2$.

EXAMPLE 2

The blown polypropylene micro-fiber web described in Example 1 was layered between layers of the nylon 6, 6 scrim obtained from the Monsanto Company under the trade designation "Cerex". The scrim was 0.08 mm thick, weighed 17 g/m$^2$, had a grab strength of 7.3 and 5.0 kg respectively in the machine and cross direction and an air permeability of 260 m$^3$/min/m$^2$.

EXAMPLE 3

The blown microfiber web described in Example 1 was layered between one layer of the spun-bonded polypropylene scrim described in Example 1 and one layer of the nylon scrim described in Example 2 to make vacuum cleaner bags.

EXAMPLE 4

A 500 mm by 500 mm piece was cut from the composite web described in Example 3. The 500×500 mm piece of composite web having a 54 mm diameter hole in the center of a quadrant was then folded in half upon itself with the nylon scrim facing out. The edges of the bag were then sewn to form a closed bag. A 100 mm square piece of 1 mm thick cardboard having a 54 mm diameter hole and rounded outside edges as shown in FIG. 2 of the drawing was adhered to the outer surface of the nylon scrim centered over the 54 mm hole of the closed bag as shown in Example 2 using a suitable hot melt adhesive. The cardboard piece formed an opening for later attachment to the outlet of a vacuum cleaner. This bag, when compared to a commercial paper vacuum bag, passed far less fine particulate dust into the air, was more resistant to damage and held more soil before disposal was required.

EXAMPLE 5

A vacuum cleaner bag was made from the composite web of Example 2 following the procedure of Example 4 with the same good result as described in Example 4.

EXAMPLE 6

An elongate tube for a vacuum bag was formed from a non-porous to air 0.17 mm thick flex- and tear-resistant spun-bonded polyolefin sheet material available under the trade designation "Tyvek" 1056D. A 280 mm by 500 mm piece of the "Tyvek" sheet material, having a 65 mm diameter cut-out hole located 75 mm from the 280 mm edge and 30 mm from the 500 mm edge was folded upon itself and sealed along the long edge to yield a tube 500 mm long having a 255 mm inside circumference. The flattened tube was placed over a 500 mm by 500 mm piece of the composite web of Example 3 which was folded upon itself. A comparable hole had been cut in the folded composite so that, when it was centered over the flattened tube, the holes were juxtaposed. The edges of the folded composite and the end of the flattened tube (which was aligned with the edge of the folded composite) were sewn to provide a seam. A hot melt adhesive was applied to the outside surface of composite bag around the cut-out hole and the surface of the flattened elongate tube having a mating hole was forced against the freshly applied hot melt adhesive to secure and seal the tube to the bag. This bag performed well in use and did not have a tendency to become plugged with debris in the tube.

EXAMPLE 7

A 100 mm square of 1 mm thick cardboard having a 54 mm diameter hole and rounded edges as shown in FIG. 2 was adhered, using a suitable hot-melt adhesive, to the surface of a 300 mm by 560 mm piece of the composite web of Example 3. The cardboard piece was centered in the upper half of the composite web and upon the nylon scrim surface. A 300 mm by 560 mm piece of transparent heat-sealable polyester film available under the trade designation "Scotch-Pak" Film No. 1220 from Minnesota Mining and Manufacturing Company was placed over the surface of the other support layer (polypropylene scrim) of the composite so that the heat softenable side of the heat sealable film was in contact with the composite web. The polyester film and the composite web were heat sealed together along the outside edges to form a bag. The sealing was accomplished by pressing the edges at 190° C. for 0.5 seconds and clamping pressure of $2.75 \times 10^5$ pascal. The resultant bag performed well on a vacuum cleaner and the level of dirt and soil in the bag was easily visible.

We claim:

1. A disposable filter especially suited for use as a dust and debris collection device for a vacuum cleaning apparatus, said filter comprising an assemby of juxtaposed layers, as follows:
    (a) a first outer support layer of highly porous fabric formed of synthetic fibers, said fabric having an air permeability of at least 100 m$^3$/min/m$^2$ and a grab strength of at least about 1.0 kg;

(b) an inner filter layer formed of a web comprising randomly interentangled synthetic polymeric micro-fibers having an average diameter of about 2 to 6 microns and having a weight of about 70 to 140 g/m$^2$ and an air permeability of about 8 to 20 m$^3$/min/m$^2$; and (c) a second outer supper layer of highly porous fabric formed of synthetic fibers, said second outer support layer being disposed on the opposite side of said web from said first outer support layer, said fabric of said second layer having an air permeability of at least 50 m$^3$/min/m$^2$ and a grab strength of at least about 1.0 kg wherein said layers are disposed with said first outer support layer positioned to initially receive an air stream passing through said layers.

2. The disposable filter of claim 1 wherein said first and said second support layers comprise spun-bonded filament fabric of synthetic polymeric material.

3. The disposable filter of claim 1 wherein said support layers are webs weighing about 15 to 25 g/m$^2$ and having air permeability of at least 300 m$^3$/min/m$^2$.

4. The disposable filter of claim 1 in the form of a sheet.

5. The disposable filter of claim 1 in the form of a bag wherein said assembly of layers comprises at least a portion of the bag wall and said bag including an inlet for attachment to the discharge opening of a vacuum cleaner.

6. The disposable filter of claim 5 wherein a portion of said bag wall comprises a transparent flexible film.

7. The disposable filter of claim 5 wherein said inlet comprises an elongated tube.

8. The disposable filter of claim 7 wherein said elongated tube is substantially impervious to air.

* * * * *